United States Patent [19]

Lipsky

[11] 3,906,505

[45] Sept. 16, 1975

[54] METHOD AND APPARATUS FOR DETERMINING THE DIRECTION OF ARRIVAL OF A SIGNAL

[75] Inventor: Stephen E. Lipsky, East Hills, N.Y.

[73] Assignee: General Instrument Corporation, Clifton, N.J.

[22] Filed: Oct. 9, 1973

[21] Appl. No.: 404,312

[52] U.S. Cl............................... 343/119; 343/123
[51] Int. Cl.......................................... G01s 5/04
[58] Field of Search.............. 343/106 R, 119, 123

[56] References Cited
UNITED STATES PATENTS

| | | | |
|---|---|---|---|
| 2,324,548 | 7/1943 | Wheeler | 343/119 |
| 2,498,919 | 2/1950 | Heller | 343/123 |
| 2,952,849 | 9/1960 | Davis | 343/119 |
| 2,977,588 | 3/1961 | Korman | 343/119 |
| 2,994,080 | 7/1961 | Varela | 343/119 |
| 3,050,729 | 8/1962 | Fromm | 343/119 |

*Primary Examiner*—Maynard R. Wilbur
*Assistant Examiner*—T. M. Blum

[57] ABSTRACT

The method and apparatus for determining the direction of arrival of a signal utilizes a pair of omnidirectional antenna elements, the outputs of which are phase combined such that the elements are effective to form a pair of simultaneous cardioid reception patterns. Separate logarithmic data signals are generated which are a function of the magnitude of the signal as received by each of the reception pairs. The logarithmic data signals are then normalized to eliminate any signal time variation therein and to form a resultant signal indicative only of the direction of arrival of the received signal.

12 Claims, 4 Drawing Figures

METHOD AND APPARATUS FOR DETERMINING THE DIRECTION OF ARRIVAL OF A SIGNAL

The present invention relates to direction-finding systems and more particularly to a monopulse cardioid pair direction-finding system.

Measurement of the direction of arrival of signals in the VHF and UHF frequency ranges has proven useful in numerous applications. Equipment capable of performing this function is particularly useful in airborne navagational systems for obtaining accurate bearing measurements. However, when such systems are used on aircraft, airflow considerations impose severe structural limitations upon the type of antennas which can be utilized. Obviously, in airborne applications the antennas must be of a size, weight and shape such that they do not adversely effect the aerodynamics of the craft. For this reason, the cardioid antenna pattern is often used in airborne applications since it can be developed by simple dipoles and feeds, which are small in size and weight and can be implemented in the avionics processing system.

A cardioid pattern can be developed by two omnidirectional source elements of the same amplitude which are spaced one-quarter wavelength apart and fed 90° out of phase. However, this type of reception pattern has the disadvantage of having limited resolution capability over the 90°–180°–270° azimuthal, due to the broad beam pattern which exists in this arc. The most useful region of the cardioid pattern for directional-finding measurement is in the null region extending 60° from boresight in either direction. This portion of the pattern has the highest resolution capability because in this region there is a maximum change in the pattern per degree of azimuthal variation. Thus, although the cardioid reception pattern can be developed in a manner which makes it desirable for airborne applications, the resolution capability varies with direction and therefore this pattern has limited usefulness in directional-finding measurement.

Other problems are also associated with this type of reception pattern when the pattern is used for wide radio frequency bandwidth applications. Since the spacing between the radiating antenna elements is fixed, and the lengths of the elements are constant, the entire cardioid pattern changes gain while maintaining its shape due to frequency variations in the received signal. As a result of these gain changes, a simple amplitude measurement system would be unable to determine whether a change in amplitude was due to the arrival angle of a received signal or due to variations in the received signal. Because of these gain changes it is often necessary to know the frequency of arrival of the signal to program the detection circuits to compensate for frequency variations. Such programming adds substantially to the complexity of the system.

It is, therefore, a prime object of the present invention to provide a direction-finding system which utilizes simple dipoles as antenna elements and therefore is suitable for airborne applications.

It is another object of the present invention to provide a system of direction-finding measurement which can be made unambiguous over 360° of azimuthal for a given degree of resolution.

It is still another object of the present invention to provide a system of direction-finding measurement which provides a monopulse output which is independent of input signal variations.

It is a further object of the present invention to provide a system of directional-finding measurement which is frequency independent over the range of capability of formation of the cardioid pattern.

It is still a further object of the present invention to provide a directional-finding measurement system which utilizes logarithmic normalization to produce an output signal which is fully independent of the strength of the received signal and variations thereof due to modulation, transmission path and reflections.

In accordance with the present invention apparatus for determining the direction of arrival of a signal is provided utilizing a pair of omnidirectional antenna elements. Means are provided for phase combining the outputs of the antenna elements such that the elements are effective to form a pair of simultaneous cardioid reception patterns. Means for generating separate data signals which are a function of the magnitude of the signal as received by each reception pattern is provided. The data signals are then normalized to eliminate any signal time variation therein and to form a resultant signal indicative only of the direction of arrival of the received signal.

Phase combining of the antenna outputs is accomplished by means of a quadrature hybrid. This device combines an in-phase component of the first antenna element with an out-of-phase component of the second element. A second phase combined signal is formed from the sum of the out-of-phase component of the first antenna element and the in-phase component of the second antenna element. The out-of-phase component of the output of each antenna element is 90° out of phase with the in-phase component due to the quadrature properties of the hybrid. This coupling system is effective to produce two simultaneous cardioid reception patterns which are oppositely oriented. The null of one pattern is at an 180° angle with the null of the other.

A logarithmic function of each of the phase combined signals is then generated by means of a video logarithmic amplifier. The logarithmic data signals are normalized by subtracting one from the other such that any signal time variations common to both cancel out. These signal time variations are normally due to changes in the strength of the received signal and variations of the signal due to modulation, transmission path and reflections. The mathematical cancellation of these input signal variations provides a resultant signal which is indicative of the direction of arrival of the received signal only.

Because of the directional nature of the cardioid pattern and the symmetrical character of a pair of 180° out-of-phase simultaneous cardioid reception patterns, it is not possible to obtain unique measurements of the direction of arrival of a received signal by utilizing a single cardioid reception pattern pair. The characteristics of the patterns only enable the processing equipment associated with a single pattern pair to produce a solution having ambiguities therein. A single pattern pair can determine the number of degrees from boresight which the received signal lies but not in which direction. Thus a reception pattern pair oriented in a north-south direction will be unable to distinguish a signal coming from the east from one coming from the west.

In order to rectify this situation, a second pair of simultaneous cardioid patterns are formed in precisely the same manner as the first. The second pattern pair is oriented at 90° with respect to the first, and thus the ambiguities associated therewith will be in different regions than the ambiguities of the first pattern pair. A received signal is processed by one pattern pair and the ambiguities present in the measurement obtained are resolved by additionally processing the signal as received by the other pattern pair and combining the outputs. In this way a unique measurement is obtained. The appropriate pattern pair for initial signal processing is automatically selected by a comparison of the processed signals and thus depends upon the direction of arrival of the received signal.

The degree of resolution at each boresight depends upon the rate of change of the cardioid patterns due to variations in the frequency of the received signal, known as rolloffs, and upon the ambient noise level. If gross accuracies of plus or minus 20° are all that is required by the system, the simple double pattern pair technique will suffice. However, if greater resolution is required, the total number of antennas may be increased to provide an increase in resolution at the boresight points. Moreover, accuracy may be enhanced mathematically by error splitting and assignment.

To the accomplishment of the above and to such other objects as may hereinafter appear, the present invention relates to method and apparatus for determining the direction of arrival of a signal as defined in the appended claims and as described in the specification, taken together with the accompanying drawings wherein like numerals refer to like parts and in which:

Figure 1:
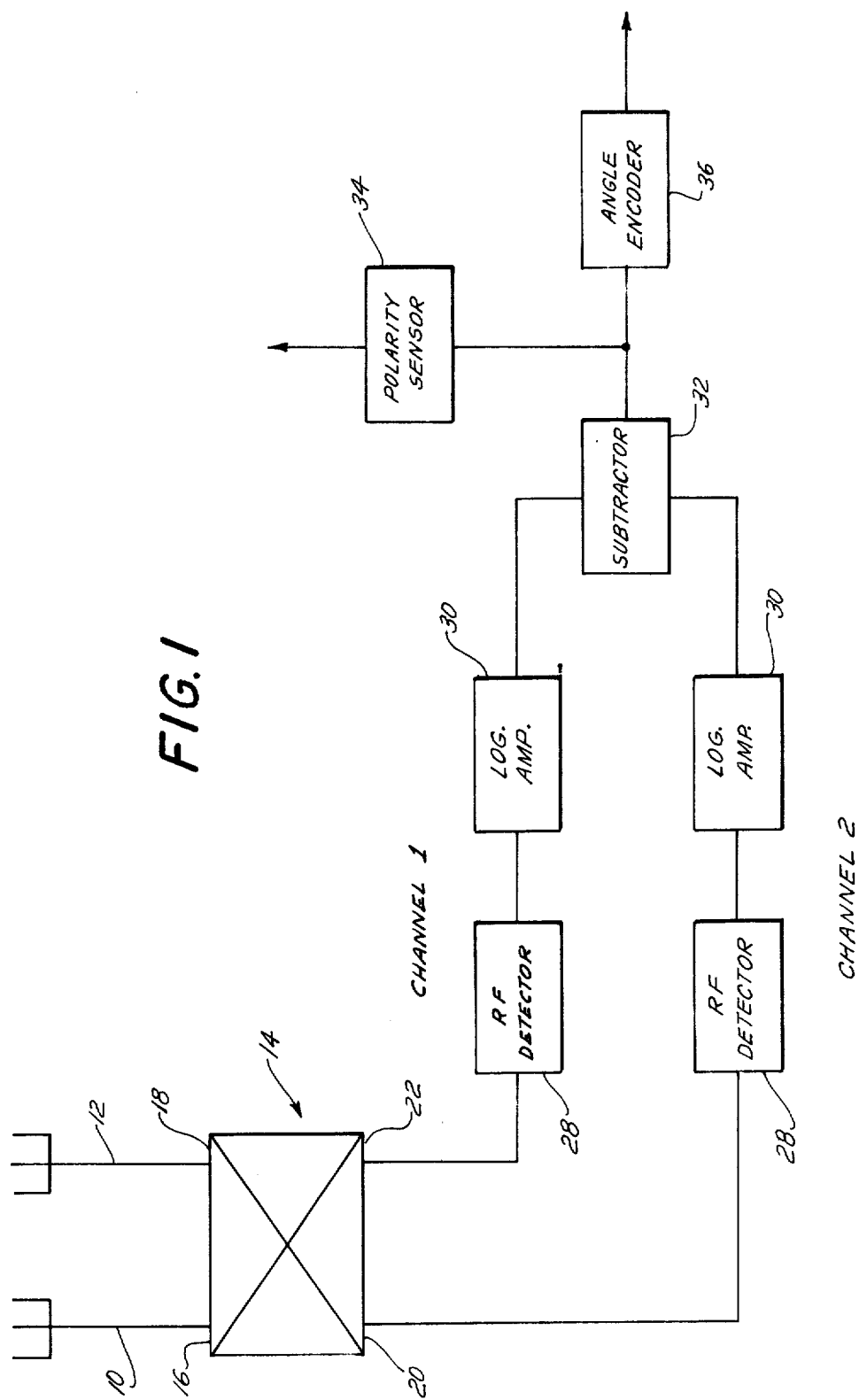
FIG. 1 is a schematic diagram of the signal processing circuitry of the present invention.

As seen in FIG. 1, the system of the present invention utilizes a pair of omnidirectional antenna elements 10 and 12. Elements 10 and 12 are preferably isotopic dipoles of the same amplitude and are spaced one-quarter wavelength apart. Antennas 10 and 12 are fed by a directional coupler in the form of a quadrature hybrid, generally designated 14. Hybrid 14 has two input ports 16 and 18 which are connected to elements 10 and 12, respectively. Hybrid 14 has two output ports 22 and 20 which are connected to the processing circuitry of channel 1 and channel 2, respectively. This component exhibits the property of providing a 90° phase shift to a signal passing from port 16 to port 22 or from port 18 to port 20. Signals passing from port 16 to port 20 or from port 18 to port 22 experience no phase shift. Antenna elements of the dipole type will be effective to form a cardioid reception pattern when fed with two signals, one of which is 90° out of phase with the other. Thus, through the use of quadrature hybrid 14, antenna elements 10 and 12 are effective to form a pair of simultaneous cardioid reception patterns.

Figure 2:
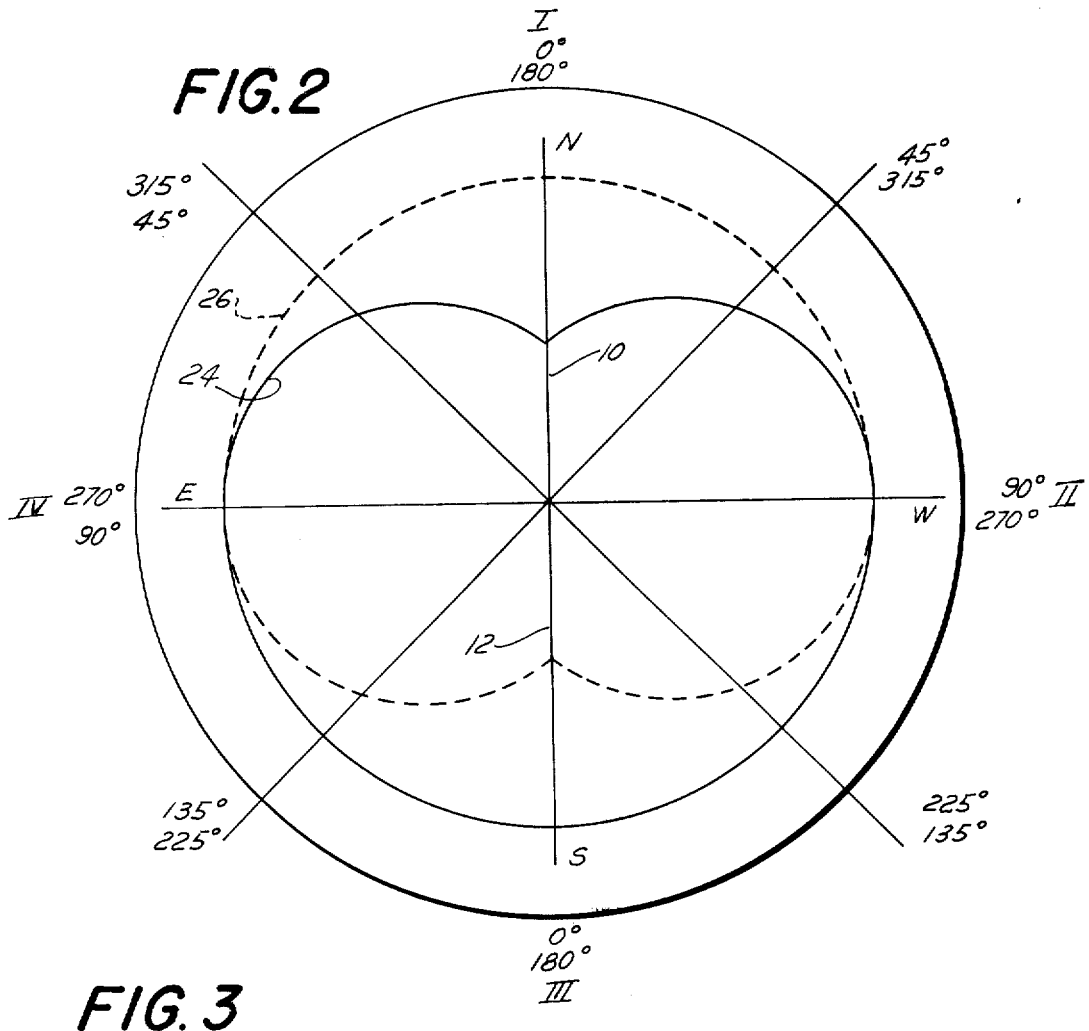
FIG. 2 is a graphical representation of a simultaneous cardioid reception pattern formed by the circuitry of FIG. 1.

FIG. 2 is a graphical representation of the reception patterns which are formed through the use of the circuitry depicted in FIG. 1. Assuming that antennas 10 and 12 are oriented in a north-south manner, cardioid pattern 24, represented by a solid line, and cardioid pattern 26, represented by a dash line, are simultaneously formed. The signal received by pattern 24 appears as a phase combined signal at port 20. The signal received by pattern 26 appears as a phase combined signal at port 22.

The strength of the phase combined signal generated by each pattern when a signal is received depends upon the shape of the pattern at the incident angle. Cardioid pattern 26 will generate a stronger phase combined signal than pattern 24 for a signal arriving in quadrant I because it is in this quadrant that the most amplitude sensitive portion of this pattern 26 exists. Likewise, cardioid pattern 24 will generate a stronger phase combined signal than pattern 26 for a signal arriving in quadrant III because it is in this quadrant that the most amplitude sensitive portion of pattern 24 is present.

Processing the phase combined signals from patterns 24 and 26 will determine the number of degrees from boresight at which a signal arrives, but not on which side, i.e. east or west of boresight the angle is on. This ambiguity exists because of the symmetry of the patterns. In other words, if 0° is taken as boresight, an angle of arrival of 25° cannot be distinguished from 335°. Thus the angle determination is not unique.

It can be seen that the simultaneous cardioid pattern pair shown in FIG. 2 is effective to distinguish whether a signal arrives in quadrant I or quadrant III. However, if the direction of the received signal is in quadrants II and IV, it is not possible (because the patterns are approximately equal in these regions) to determine which of these quadrants the signal is coming from until either quadrant I or III is approached as the azimuthal is transversed.

More specifically, if the direction of arrival of the received signal falls within quadrant I, then the signal received by cardioid 26 and processed in channel 1 will be greater than the signal received by cardioid 24 and processed by channel 2. Thus, when the output of channel 1 is larger than the output of channel 2, it is known that the received signal arrived in quadrant I. When the signal arrives in quadrant III, the signal received by cardioid 24 and processed by channel 2 will be greater than the signal received by cardioid 26 and processed by channel 1. If the output signal of channel 2 is greater than the output signal of channel 1, it is known that the signal was received in quadrant III. If, however, the outputs of channel 1 and channel 2 are substantially equal, it is not known whether the signal was received in quadrant II or in quadrant IV. This ambiguity due to the characteristics of the first pattern pair is resolved through the use of a second pair of simultaneous cardioid reception patterns as described in detail below.

Referring again to FIG. 1, each channel of the processing circuitry contains a radio frequency detector 28 and a video logarithmic amplifier 30. As described above, the output at port 20 of quadrature hybrid 14 is a phase combination of the outputs of antennas 10 and 12 and represents the signal received by pattern 24. Specifically, it is the sum of an in-phase component from element 10 and a 90° out-of-phase component of element 12. Likewise, the output of port 22 is the sum of an in-phase component of element 12 and a 90° out-of-phase component of element 10 and represents the signal as received by pattern 26. The radio frequency detector 28 of channel 1 detects the signal from port 22. Likewise, the radio frequency detector 28 of channel 2 detects the signal at port 20. The video logarithmic amplifier 30 connected to radio frequency detector 28 in each channel generates a data signal which is a logarithmic function of the amplitude of the signal sensed by the detector.

The outputs of the logarithmic amplifier 30 in each channel are then fed to subtractor 32 which subtracts the logarithmic data signals in order to eliminate any signal time variations common thereto. Mathematically this normalization process occurs as follows: If a received signal with some signal time variation designated as f(t) arrives at an angle $\phi$ from boresight, a voltage $E_N$ is detected by the radio frequency detector 28 associated with channel 1. This voltage is a result of the reception of the signal by cardioid pattern 26. Likewise, a voltage $E_S$ is detected by radio frequency detector 28 of channel 2; this voltage is a result of the reception of the signal by cardioid pattern 24. The video log amplifier 30 in each channel takes the log of the voltage detected by the radio frequency detector 28 associated therewith. Subtractor 32 then subtracts the logs of voltages $E_N$ and $E_S$ according to the following equation:

$$\log f(t) E_N - \log f(t) E_S = \log \frac{f(t) E_N}{f(t) E_S} = \log \frac{E_N}{E_S}$$

This equation is in accordance with the well-known mathematical properties of logarithims. It is apparent that the resultant ratio is a function of the voltages received by each pattern and may be used to determine the number of degrees from boresight the signal lies. However, the ratio is not indicative of which side of boresight the received signal is on. Because of this normalization process, the ratio is dependent upon the pattern shapes alone, since any signal time variation $f(t)$ which is common to both channels is cancelled out. In this manner, changes in amplitude of the received signal and variations thereof due to modulation, transmission path and reflections are mathematically deleted.

It is necessary that the processing equipment used in channel 1 and channel 2 of the apparatus be identical gain-matched logarithmic channels. Although these channels are preferably comprised of a radio frequency detector coupled to a video logarithmic amplifier, they may also be of a super-heterodyne configuration using logarithmic intermediate frequency amplifiers, depending upon the radio frequency band-width and the sensitivity required of the system. Radio frequency preamplification may also be used ahead of each channel to increase the system sensitivity if necessary for a given application. Moreover, subtractor 32 may be any bipolar subtractor conventional in the art, such as a differential amplifier.

If the signal from channel 1 is greater than the signal from channel 2, subtractor 32 will produce an output of a particular polarity, for example positive. On the other hand, if the output of channel 2 is greater than the output of channel 1, subtractor 32 will produce an output of opposite polarity, i.e. negative. Polarity sensor 34 detects these conditions as well as the condition where the outputs of channel 1 and channel 2 are substantially equivalent and indicates which of the three conditions prevail.

Although FIG. 2 shows the azimuthal divided into four equal 90° quadrants, such a quadrant definition is not required. The definition of the quadrant may be obtained by setting the degree of difference between the signals necessary to indicate whether the data signal from channel 1 is larger than the data signal from channel 2 or vice versa. Thus, the quadrant can be defined as long as there is a significant and measurable difference between the signals that is due to the variation in the patterns from the null. However, for purposes of illustration, it is convenient to use quadrants having 90° coverage.

By subtracting the logs as indicated above, the monopulse ratio between the data signals of channel 1 and channel 2 is formed. This ratio determines the number of degrees from boresight the received signal lies because it is actually the monopulse ratio of a function of the amplitudes of the signals received by the individual cardioid reception patterns.

Figure 3:
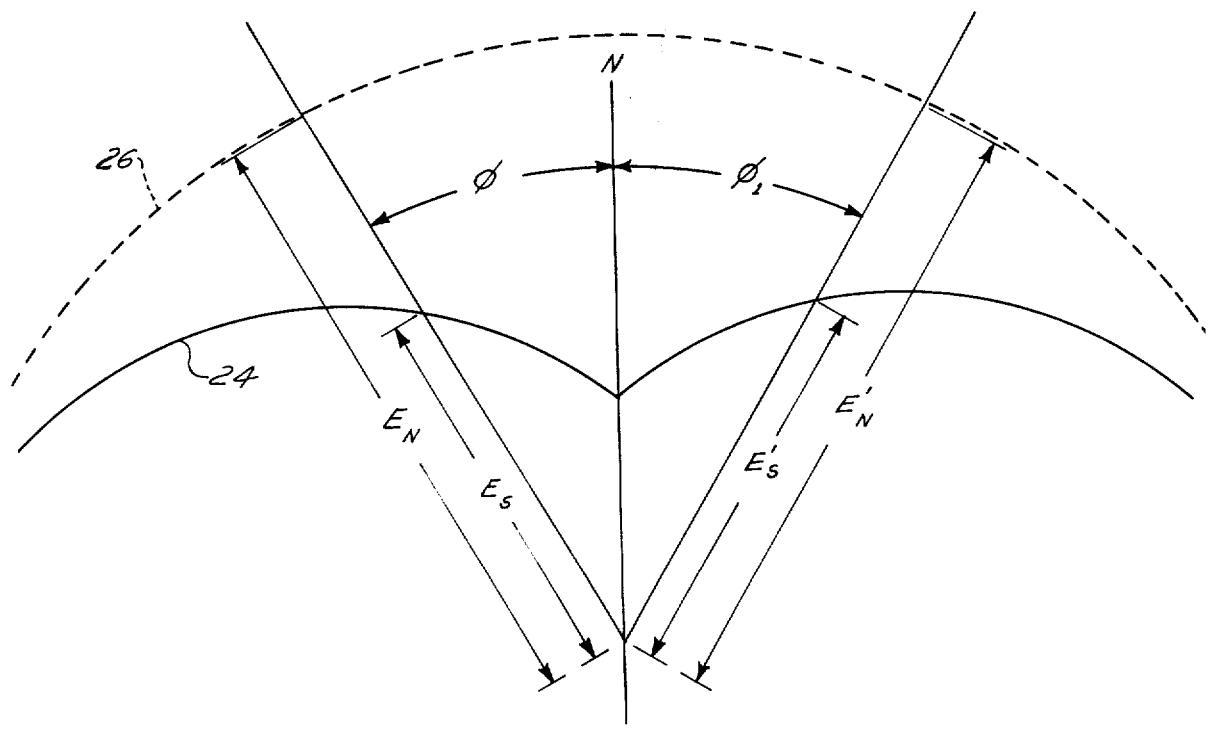
FIG. 3 is an enlarged view around the boresight of the reception pattern of FIG. 2.

As can be seen by FIG. 3, an ambiguity around boresight exists because of the symmetry of the cardioid patterns. Consider two signals, one of which arrives at an angle $\phi$ from boresight and the other of which arrives at an angle $\phi_1$ from boresight, angles $\phi$ and $\phi_1$ being equal but on opposite sides of boresight. Upon receipt of the signal at an angle $\phi$ from boresight, pattern 26 will generate a voltage $E_N$ and pattern 24 will generate a voltage $E_S$. Likewise, upon receipt of the signal at an angle $\phi_1$ from boresight, pattern 26 will generate a voltage $E_N$ and pattern 24 will generate a voltage $E_S$. Since the ratio of $E_N/E_S$ is precisely equal to the ratio of $$\frac{E_N'}{E_S'}$$

the resultant log of the ratios will be precisely the same for a signal received at angle $\phi$ or angle $\phi_1$. This ambiguity about boresight is precisely the same ambiguity that is present in quadrants II and IV, as described above, and a resolution of this ambiguity will make the angle determination unique.

A determination of the number of degrees which a received signal is from boresight is achieved through the use of angle encoder 36. Encoder 36 is a digital logic circuit which translates the value of the logarithmic ratio into an angular measurement by consulting a stored table of values. Thus, angle encoder 36 gives a measurement of the number of degrees the received signal is from boresight but does not determine on which side of boresight the angle lies. For instance, the output of angle encoder 36 may indicate that the angle of arrival is 36° from boresight. Polarity sensor 34 will indicate whether the angle of arrival is north or south if the signal has arrived in quadrants I and III, respectively. However, in order to have a unique angle determination, it is necessary to utilize an additional simultaneous cardioid reception pattern pair to determine whether the angle is east or west of boresight.

The second simultaneous cardioid pattern pair is developed in precisely the same manner as described above. The antenna elements which form this pair are located in an east-west orientation and thus orthogonal to antenna elements 10 and 12. Signals received by the east-west antenna elements will be processed in precisely the same manner as described above.

Figure 4:
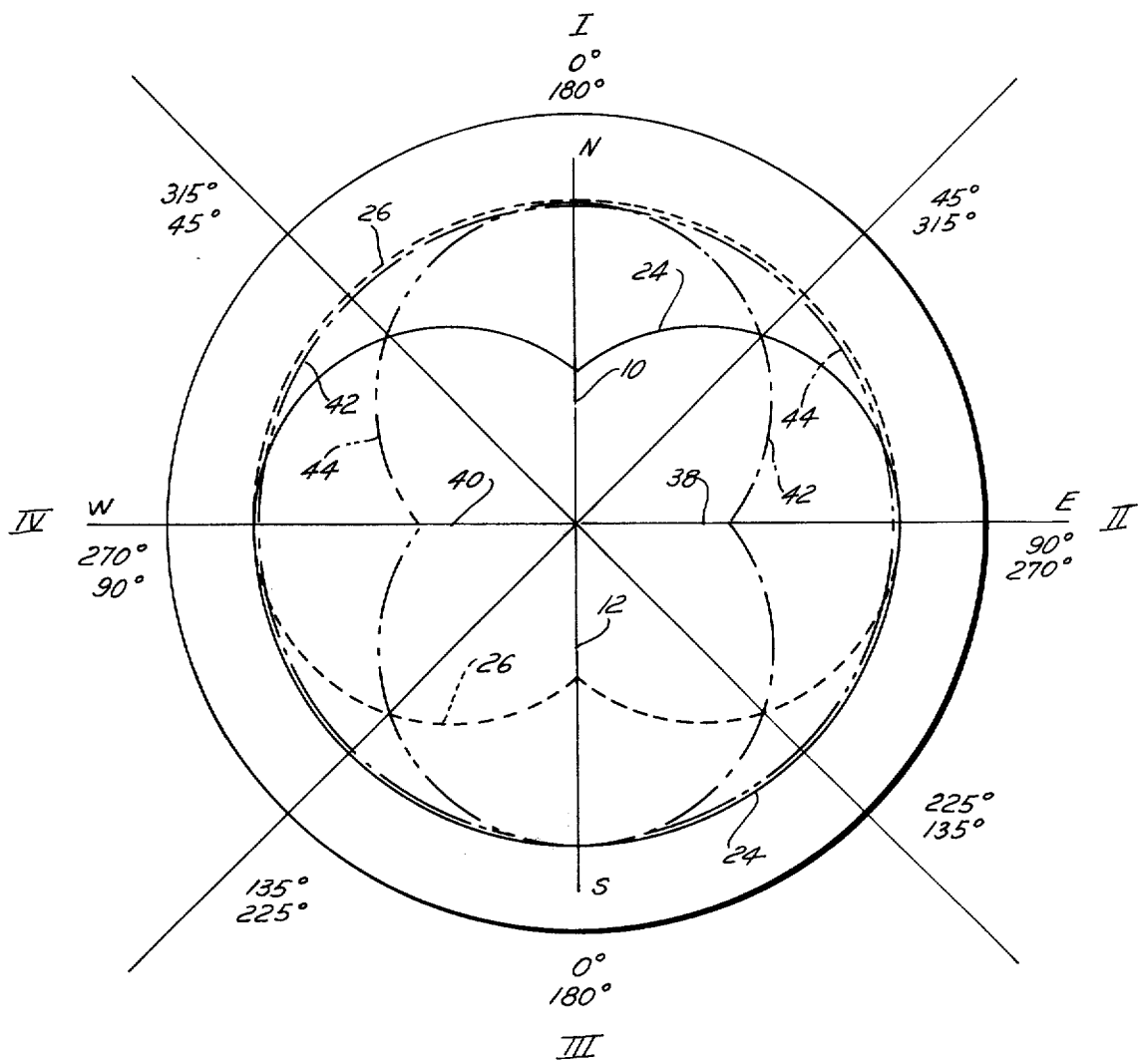
FIG. 4 is a graphical representation of two simultaneous cardioid reception pattern pairs oriented at 90°.

FIG. 4 is a graphical representation of the reception pattern formed by the system. As can be seen, four antenna elements 10, 12, 38 and 40 are utilized to form four simultaneous cardioid reception patterns 24, 26, 42 and 44. Each cardioid pattern is 180° out of phase with the other cardioid pattern in its pair. Each pair of cardioid patterns is 90° out of phase with the other pair. By the use of two pattern pairs, the bearing measurement can be made unique. For clarity, certain of the pattern lines are offset from their actual positions because of the overlapping nature of the simultaneous patterns.

The first cardioid pair 24, 26 is used to measure the number of degrees from the north-south boresight and to indicate whether the received signal is in quadrant I or III. Likewise, the second cardioid pair 42, 44 measures the number of degrees from the east-west boresight and indicates whether the received signal is in quadrants II or IV. Each cardioid pair is utilized to resolve the ambiguity of the other cardioid pair.

For example, if a signal is received in quadrant I, the polarity sensor associated with the north-south pattern pair will sense a signal from the subtractor having a definite polarity, for example positive, indicative of the north direction. The angle encoder associated with the north-south pattern pair will give an output which determines the number of degrees the received signal is from boresight. Thus, it is determined that the signal is a known number of degrees either east or west of the north boresight. The received signal will also be received by the east-west pair. The east-west pattern pair will be able to determine the number of degrees the signal is from the east-west boresight, but will not be able to determine whether the signal is coming from the north or from the south. By combining the information from the east-west reception pair with the information from the north-south reception pair a unique bearing measurement may be obtained.

For example, if the data from the first cardioid pair indicates that the angle of arrival is 40° east or west of the north boresight and the data from the second pair indicates that the angle of arrival is 50° north or south of the east boresight, the signal must be 40° east of north. Thus a unique bearing measurement is obtained.

In other words, the ambiguity of one cardioid pair is resolved by the other. The decision as to which pattern pair to use initially is made by comparison of the signals in the same manner as quadrant selection is performed. North and south signals are compared to determine quadrant I or quadrant III; if the signals are equal, the east-west pair is selected. The ambiguity around the boresight of a given pair is resolved by the other pair.

The degree of resolution at each boresight depends upon pattern rolloffs, which are the rate of change of the reception patterns due to variations in the frequency of the received signal. Further, the ambient noise level is such that accuracies of ±20° are generally the best that can be obtained for this type of system. Therefore, where greater resolution is required, another set of four antennas operating in a manner described above can be oriented with respect to the original set to provide additional coverage at the boresight areas, thus reducing the areas of uncertainty and moving them to the cross-over decision axis between the systems.

Another method can also be used to reduce the error of the present invention at the point of boresight ambiguity. An error in assignment of the direction of the incoming signal may result because of the symmetrical nature of the patterns around the boresight as described above. As a result, the incoming signal could be erroneously assigned to the wrong side of the null. The quadrature spaced additional set of antennas may be used to reduce the ambiguity; however, the amount which the ambiguity will be reduced still depends upon pattern rolloffs and upon the level of ambient noise.

This error in assignment may be reduced mathematically by using only a portion of the voltage ratio instead of the full ratio. One-half is a convenient value to use in this regard. If, for example, the ratio indicated a 20° angle between boresight and the angle of arrival of the signal, an error in assignment could, by placing this value on the wrong side of boresight, create an indication 40° away from the actual angle. If, however, the ratio were halved to 10°, the maximum error due to improper assignment would only be 20°. This mathematical error-splitting technique can be used up to the point where there is no ambiguity due to pattern shape variations.

The individual circuits utilized in processing the signals as described above are known to those skilled in the art. Because these circuits are known they have not been described in detail. Further, other circuits of comparable function could be utilized equally effectively to achieve similar results.

A preferred embodiment of the present invention has been specifically disclosed herein for purposes of illustration. It is apparent that many variations and modifications may be made upon the specific structure disclosed herein. It is intended to cover all of these variations and modifications which fall within the scope of this invention as defined by the appended claims.

I claim:

1. Apparatus for determining the direction of arrival of a signal comprising a pair of omnidirectional antenna elements, means for phase combining the output signals from said elements such that said elements are effective to form a pair of simultaneous cardioid reception patterns, means for generating separate data signals representative of the magnitude of the signal received by each of the cardioid patterns respectively and means for detection and signal normalization, said detection and signal normalization means being frequency independent throughout the instantaneous radio frequency band over which the cardioid pattern is capable of being formed, thus providing a resultant signal indicative only of the direction of arrival of said received signal.

2. The apparatus of claim 1 wherein said means for the detection and signal normalization comprises means for amplifying said detected signals to form separate data signals.

3. the apparatus of claim 2 wherein said amplifying means comprises a video logarithmic amplifier.

4. The apparatus of claim 2 wherein said detection means comprises a radio frequency detector.

5. The apparatus of claim 1 wherein said phase combining means comprises a quadrature hybrid.

6. The apparatus of claim 1 wherein each of said reception patterns is 180° out of phase with the other.

7. The apparatus of claim 1 wherein said phase combining means sums an in-phase component of the output of one of said elements with a 90° phase-shifted component of the output of the other of said elements.

8. The apparatus of claim 1 further comprising means for sensing the polarity of said normalized detection signal to determine whether the data signal associated with one of said patterns is greater than the data signal associated with the other of said patterns.

9. The apparatus of claim 8 further comprising means for forming a second pair of simultaneous cardioid reception patterns, said second pattern pair being oriented at a 90° angle from the first pattern pair and means for processing the signals received by said second pattern pair to form a second resultant signal indicative only of the direction of arrival of a received signal.

10. A method for determining the direction of arrival of a signal comprising the steps of forming a pair of simultaneous cardioid reception patterns, detecting over a broad range within the frequency band over which the cardioid patterns are capable of being formed the output of each of said patterns caused by a signal received thereby, separately logarithmically amplifying the signals representative of the amplitude of the detected output of each of said patterns, respectively, subtracting one of said logarithmic signals from the other of said logarithmic signals such that any signal time variation therein is eliminated, and forming a resultant signal indicative only of the direction of arrival of said received signal.

11. The method of claim 10 wherein said patterns are formed by combining the in-phase component of the output of one element of an omnidirectional antenna element pair with the 90° out-of-phase component of the output of the other element in said pair.

12. The method of claim 10 further comprising the step of sensing whether or not one of said logarithmic signals is greater than the other.

* * * * *